(12) United States Patent
Ueki et al.

(10) Patent No.: US 6,805,003 B2
(45) Date of Patent: Oct. 19, 2004

(54) MASS FLOW SENSOR AND MASS FLOWMETER COMPRISING THE SAME

(75) Inventors: Masatoshi Ueki, Aichi (JP); Takio Kojima, Aichi (JP); Yoshinori Tsujimura, Aichi (JP); Kouichi Ikawa, Gifu (JP); Yoshihiko Kohmura, Aichi (JP); Takafumi Oshima, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/962,346

(22) Filed: Sep. 26, 2001

(65) Prior Publication Data

US 2003/0056586 A1 Mar. 27, 2003

(51) Int. Cl.⁷ .............................................. G01F 1/68
(52) U.S. Cl. ................................................. 73/204.26
(58) Field of Search ..................... 73/204.26, 204.25, 73/204.16, 204.11, 204.17, 204.18, 204.23

(56) References Cited

U.S. PATENT DOCUMENTS

| | | | |
|---|---|---|---|
| 4,472,239 A | | 9/1984 | Johnson et al. |
| 4,501,144 A | | 2/1985 | Higashi et al. |
| 4,624,137 A | | 11/1986 | Johnson et al. |
| 4,696,188 A | | 9/1987 | Higashi |
| 5,050,429 A | | 9/1991 | Nishimoto et al. |
| 5,703,288 A | | 12/1997 | Horiguchi et al. |
| 5,708,205 A | * | 1/1998 | Yamada et al. ............ 73/204.26 |
| 5,763,775 A | * | 6/1998 | Sato et al. ................ 73/204.26 |
| 5,892,150 A | * | 4/1999 | Isono et al. .............. 73/204.26 |
| 6,134,960 A | | 10/2000 | Yamakawa et al. |
| 6,301,960 B1 | * | 10/2001 | Yamakawa et al. ........ 73/204.26 |
| 6,314,807 B1 | * | 11/2001 | Kawai et al. .............. 73/204.26 |

FOREIGN PATENT DOCUMENTS

| | | | |
|---|---|---|---|
| JP | 57-116220 | 7/1982 | ............ G01F/1/68 |
| JP | 1-185416 | 7/1989 | ............ G01F/1/68 |
| JP | 3-52028 | 8/1991 | ............ G01P/5/10 |
| JP | 5-7659 | 1/1993 | ............ G01P/5/10 |
| JP | 6-25684 | 4/1994 | ............ G01F/1/68 |
| JP | 11-344369 | 12/1999 | ............ G01F/1/68 |

* cited by examiner

*Primary Examiner*—Edward Lefkowitz
*Assistant Examiner*—Takish S Miller
(74) *Attorney, Agent, or Firm*—Sughrue Mion, PLLC

(57) ABSTRACT

A mass flow sensor includes a semiconductor substrate 1, an insulating thin film 2, heaters 311 and 312, temperature measurement resistors 321 and 322, and a protective layer 4. The heaters 311 and 312 are formed on the surface of the insulating thin film 2, and are provided adjacently such that the heater 311 is provided upstream the heater 312 and the heater 312 is provided downstream the heater 311. A cavity 5 is formed below the heaters 311 and 312, and the heaters are thermally insulated from the remaining portion of the semiconductor substrate. The temperature measurement resistors 321 and 322 are formed on the top surface of the insulating thin film 2, and are provided at opposite sides of the heaters 311 and 312, such that the resistors are aligned with respect to the flow passage of a fluid. In the mass flow sensor and the mass flowmeter including the sensor, the flow rate and flow direction of a fluid can be detected by means of merely the heaters 311 and 312, which are active elements. Therefore, the sensor and the flowmeter exhibits high-speed response with respect to change in the flow rate of the fluid.

11 Claims, 14 Drawing Sheets

MASS FLOW SENSOR AND MASS FLOWMETER COMPRISING THE SAME

BACKGROUND OF THE INVENTION

1. Field of the Invention

The present invention relates to a mass flow sensor for detecting the flow rate or mass flow of a fluid (gas or liquid), and to a mass flowmeter comprising the sensor. More particularly, the present invention relates to a mass flow sensor which realizes accurate detection of the flow rate or mass flow of a medium even when the flow rate, flow direction, or temperature of the medium changes drastically, and which is suitable for detecting the amount of intake air flowing into an internal combustion engine; and to a mass flowmeter comprising the sensor.

2. Description of the Related Art

Mass flow sensors including at least one heater formed on a substrate have been known. Such mass flow sensors are used for detecting the flow rate of a fluid by means of, for example, the degree of cooling of the heater caused by the flow of the fluid, the power or voltage required for maintaining the heater at a constant temperature, or the change in the temperature of an element which receives heat from the heater.

Some of the aforementioned mass flow sensors have a function for determining the flow direction of a fluid, as well as a function for detecting the flow rate of the fluid.

For example, (1) Japanese Patent Application Laid-Open (kokai) No. 1-185416 discloses a thermal flowmeter for an internal combustion engine including two heaters and two temperature compensation resistors, in which each heater is controlled such that the difference in temperature between the heater and a fluid becomes constant, and the flow rate and flow direction of the fluid are detected by the difference between the voltages applied to the heaters.

(2) Japanese Patent Publication (kokoku) No. 3-52028 discloses a flowmeter in which two heaters are formed on an insulating thin film having a cavity below the film, in order to reduce power consumption and increase response speed.

(3) Japanese Patent Publication (kokoku) No. 5-7659 discloses a flow rate sensor including one heater and heat detection sensors provided on both sides of the heater, the heater and the sensors being formed on an insulating thin film having a cavity below the film, in which the heater is controlled by a temperature compensation resistor such that the difference in temperature between the heater and a fluid becomes constant, and the flow rate and flow direction of the fluid are detected on the basis of the difference in temperature between the sensors.

However, since the flowmeter according to (1) described above includes a semiconductor substrate provided below the heaters, the heat capacity of the flowmeter increases by the heat capacity of the substrate. Therefore, a large amount of power is consumed for maintaining the heaters at predetermined temperatures, and response and characteristics at the time of start-up are unsatisfactory. In the case of the flowmeter according to (2) described above, the temperature of a fluid is not taken into account. In the case of the flow rate sensor according to (3) described above, saturation of output occurs at a relatively low flow rate of a fluid, since the heat detection sensor provided upstream of the heater, the sensor predominantly determining the output, is drastically cooled to a temperature near the temperature of the fluid when the flow rate of the fluid increases.

SUMMARY OF THE INVENTION

The present invention contemplates solving the aforementioned problems. It is therefore an object of the present invention to provide a mass flow sensor which consumes a small amount of power, and exhibits excellent response and characteristics at the time of start-up; as well as a mass flowmeter comprising the sensor.

A first aspect of the invention provides a mass flow sensor comprising a semiconductor substrate including a space section formed of a cavity, a notch, and/or a concave portion; an insulating thin film supported by the semiconductor substrate and adapted to provide thermal and electrical insulation; two heaters formed on a portion of the insulation thin film below which the space section is provided; two temperature measurement resistors formed on a portion of the insulating thin film which is thermally insulated from the heaters; and a protective layer formed on the insulating thin film, the heaters, and the temperature measurement resistors.

Preferably, the temperature measurement resistors are formed outside a portion of the insulating thin film below which a space section is provided. Preferably, on the insulating thin film, one end terminal of each of the heaters is connected to one end terminal of the corresponding temperature measurement resistor. Preferably, the temperature measurement resistors are provided substantially symmetrically with respect to the position of the heaters and/or a line parallel to the direction of the flow passage of a fluid under measurement.

Preferably, the temperature measurement resistors are provided along a line different from a line passing through the heater, these lines being parallel to the direction of the flow passage. Preferably, the temperature measurement resistors are disposed so as to form an interlocked configuration.

The aforementioned "space section" refers to a section including at least one of a cavity formed below a bridge structure, a notch formed by a cantilever structure, and a concave portion formed by a depression. The space section may be provided in arbitrary number.

The aforementioned "insulating thin film" may be formed from any material, so long as the film can provide thermal and electrical insulation between a semiconductor substrate and the heaters and temperature measurement resistors, which are formed on the film. Examples of the material include silicon compounds such as $SiO_2$, $Si_3N_4$, and $SiO_xN_y$. The insulating thin film may be formed as a lamination film.

When a thin film or a lamination film is formed, combination of the material and the thickness of the film may be appropriately determined in consideration of chemical durability, thermal stability, process suitability, adhesion between the film and wiring layers such as heaters and temperature measurement resistors and between the film and the semiconductor substrate, and balance between strength and stress of the film when formed into a thin film member. The insulating thin film may be formed by means of an arbitrary method such as thermal oxidation, CVD, sputtering, or application.

The wiring material for forming the aforementioned "heater" and "temperature measurement resistor" preferably has a high temperature coefficient of resistance, and undergoes minimal change in resistance and temperature coefficient of resistance even when used repeatedly for a long period of time. Examples of the material satisfying the above conditions include Pt and Ni—Cr. The method for forming the heater and temperature measurement resistor may be determined arbitrarily, and examples thereof include wet etching, dry etching, and lift off.

The aforementioned "support" may be carried out arbitrarily, so long as the insulating thin film can be supported such that the form of the film is maintained. For example, the insulating thin film may be provided on two semiconductor substrates provided so as to form a space therebetween, such that the film is bridged between the substrates. Alternatively, one end of the insulating thin film may be supported; i.e., a cantilever structure may be employed. Furthermore, the insulating thin film may be provided on a semiconductor substrate having a through-hole of arbitrary shape such that the film covers the through-hole.

In each of the aforementioned aspects of the invention, the method for producing a mass flow sensor is not particularly limited. Examples of the method include a known micro-machining technique.

A further aspect of the invention provides a mass flowmeter comprising a mass flow sensor according to the above and further comprising a circuit for maintaining, for each heater, a constant difference between the temperature of the heater and the temperature of a fluid under measurement which is detected by the temperature measurement resistor corresponding to the heater.

Preferably, the mass flowmeter comprises two bridge circuits, each bridge circuit including one of the heaters and the temperature measurement resistor corresponding to the heater; and two heater power source circuits for maintaining, for each heater, a constant difference between the temperature of the heater and the temperature of the fluid, on the basis of outputs of the bridge circuits, the outputs being voltages applied to the bridge circuits or currents flowing through the bridge circuits.

Optionally, the mass flowmeter comprises a circuit for calculating the mass flow of the fluid on the basis of a subtraction value obtained by subtracting one of the outputs from the other, and for determining the flow direction of the fluid on the basis of whether the subtraction value is positive or negative. Optionally, the mass flowmeter comprises a circuit for calculating the mass flow of the fluid on the basis of the larger of the outputs, and for determining the flow direction of the fluid on the basis of whether a subtraction value obtained by subtracting one of the outputs from the other is positive or negative. Optionally, the flowmeter comprises a circuit for calculating the mass flow of the fluid on the basis of a subtraction value obtained by subtracting one of the voltages applied to the heaters from the other or by subtracting one of the currents flowing through the heaters from the other, or on the basis of the larger of the voltages or the currents, and for determining the flow direction of the fluid on the basis of whether the subtraction value is positive or negative.

Figure 1:
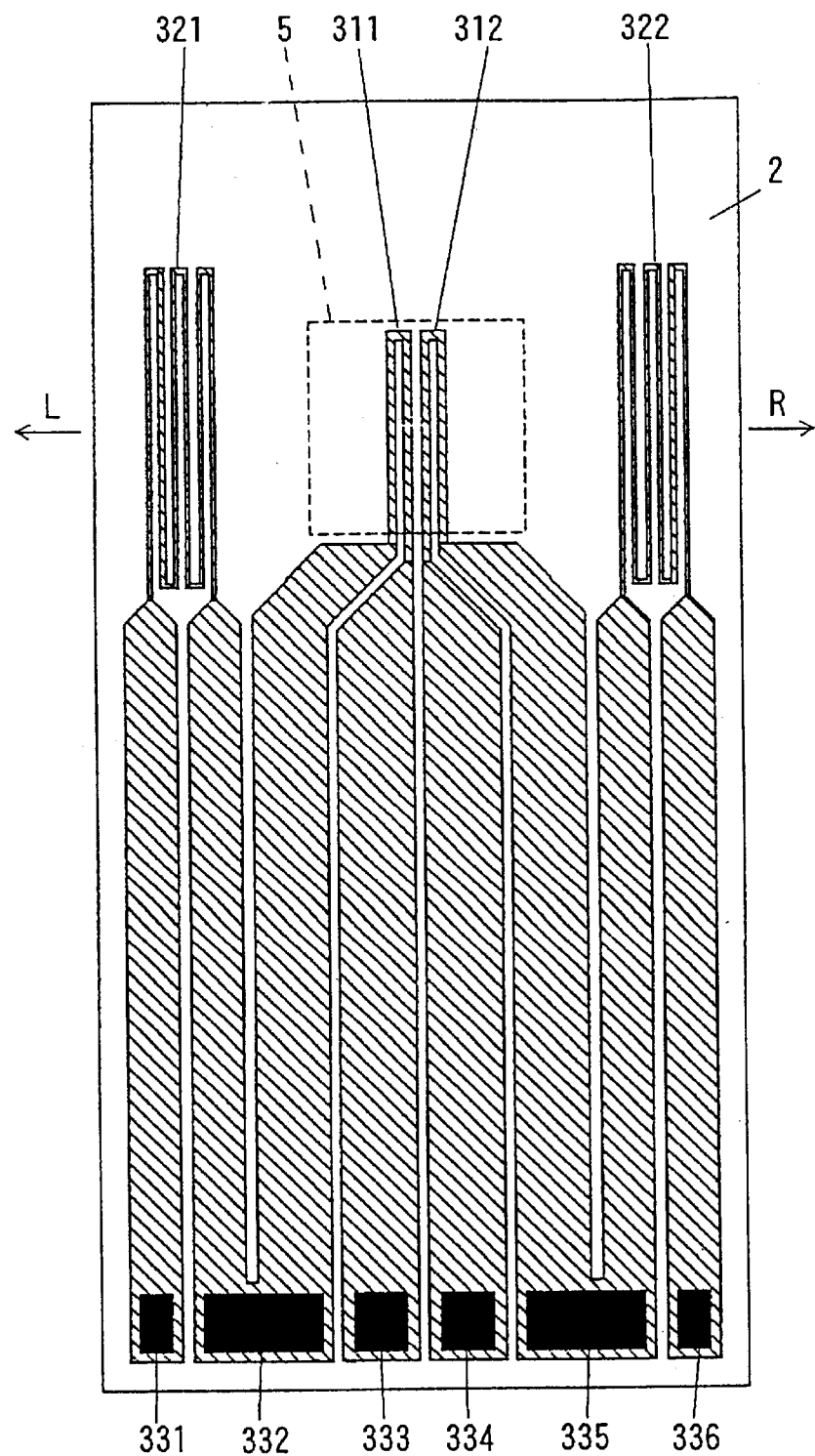
FIG. 1 is a schematic plan view for explaining a mass flow sensor of Embodiment 1.

Reference numerals are used to identify items shown in the drawings as follows:
1: semiconductor substrate
2: insulating thin film
311, 312: heater
321, 322: temperature measurement resistor
331 to 336: electrode
4: protective layer
5, 51, 52, 53: cavity

DESCRIPTION OF THE PREFERRED EMBODIMENTS

The mass flow sensor of the present invention and the mass flowmeter including the sensor will next be described in detail by reference to the drawings. However, the invention should not be construed as being limited thereto.

The mass flow sensor of each embodiment and the mass flowmeter including the sensor are provided along an intake path of an internal combustion engine such as a gasoline engine or a diesel engine, and are used for detecting the mass flow of air which is a fluid under measurement.

Embodiment 1 relates to a mass flow sensor including heaters, and temperature measurement resistors provided upstream and downstream of the heaters; and a mass flowmeter including the sensor.

1. Method for Producing Mass Flow Sensor

As described below, the mass flow sensor of Embodiment 1 is produced by means of a known micromachining technique.

(1) Firstly, an insulating thin film 2 is formed on a surface of a washed semiconductor substrate 1. The method for forming the film may be determined arbitrarily, and examples thereof include thermal oxidation, CVD, sputtering, and application.

(2) Subsequently, a wiring layer having portions serving as heaters 311 and 312, temperature measurement resistors 321 and 322, and electrodes 331 through 336 is formed on the insulating thin film 2 by means of a technique such as wet etching, dry etching, or lift off. The wiring layer is formed from a material such as Pt or Ni—Cr.

(3) Thereafter, a protective layer 4 is formed on the insulating thin film 2 and the wiring layer 3. Subsequently, portions of the wiring layer on which electrodes are to be formed are exposed by etching the protective layer 4. Thereafter, an electrode layer is formed on the entirety of the substrate, and the electrode layer is patterned, to thereby form the electrodes 331 through 336. A portion of the semiconductor substrate located below the heaters 311 and 312 is removed by etching, to thereby form a cavity 5 serving as a space section.

In general, the cavity 5 is formed by patterning an insulating thin film formed on the bottom surface of the semiconductor substrate 1, and then etching from a portion of the substrate at which silicon is exposed. Alternatively, etching may be carried out from a portion of the substrate at which silicon is exposed by patterning the protective layer 4 and the insulating thin film 2 on the top surface of the semiconductor substrate 1. In this case, patterning process and etching time may be appropriately controlled, so as to form a bottom portion below the insulating thin film 2, without removing all of the silicon substrate below the film 2.

2. Structure of Mass Flow Sensor

Figure 2:
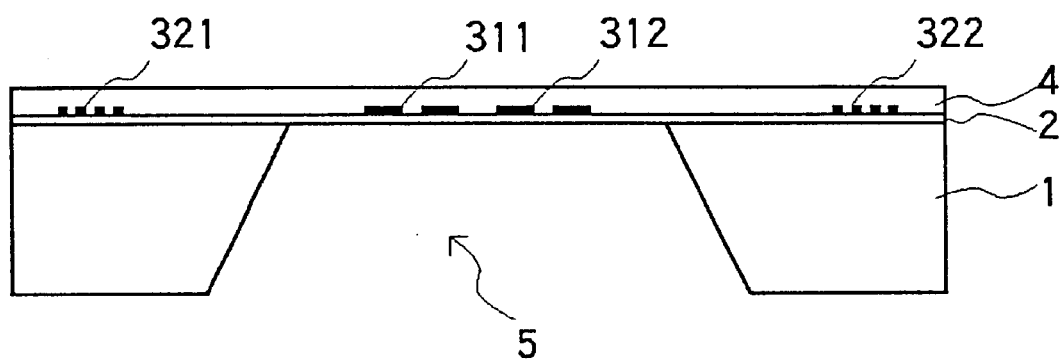
FIG. 2 is a schematic cross-sectional view for explaining the mass flow sensor of Embodiment 1.

As shown in FIGS. 1 and 2, the thus-produced mass flow sensor includes the semiconductor substrate 1, the insulating thin film 2, the heaters 311 and 312, the temperature measurement resistors 321 and 322, the electrodes 331 through 336, and the protective layer 4.

The semiconductor substrate 1 is a silicon flat plate having a length of 6 mm and a width of 3 mm. The cavity 5 serving as a space section is formed below the portion at which the heaters 311 and 312 are positioned. The insulating thin film 2 is a lamination film containing a thermal oxidation film formed by oxidation of the semiconductor substrate 1 and a silicon nitride film formed by CVD on the oxidation film. Most of the bottom surface of the insulating film 2 is in contact with the semiconductor substrate 1, but the film 2 is exposed at the cavity 5.

The heaters 311 and 312 are formed on the top surface of the insulating thin film 2, and are provided adjacently such that the heater 311 is provided upstream of the heater 312 and the heater 312 is provided downstream of the heater 311. Since the cavity 5 is formed below the heaters 311 and 312, the heaters are thermally insulated from the remaining portions of the semiconductor substrate.

The temperature measurement resistors 321 and 322 are formed on the top surface of the insulating thin film 2, and are provided on the respective sides of the heaters 311 and 312, such that the resistors are aligned with respect to the flow passage of a fluid. The temperature measurement resistor 321 corresponding to the heater 311 is positioned upstream of the heater 311, and the temperature measurement resistor 322 corresponding to the heater 312 is positioned downstream of the heater 312.

Each of the electrodes 331 through 336 is formed of a lamination film of Au and Cr, and the electrodes are used for connecting the heaters 311 and 312 and the temperature measurement resistors 321 and 322 to a circuit. As shown in FIG. 1, one end of the heater 311 is connected to one end of the temperature measurement resistor 321 by use of the electrode 332, and one end of the heater 312 is connected to one end of the temperature measurement resistor 322 by use of the electrode 335.

The protective layer 4 is a silicon nitride film formed by CVD. Since the protective layer is formed so as to cover the wiring layer having the heaters 311 and 312 and the temperature measurement resistors 321 and 322, contamination of or damage to the heaters and the resistors can be prevented.

3. Mass Flowmeter Circuit

Figure 3:
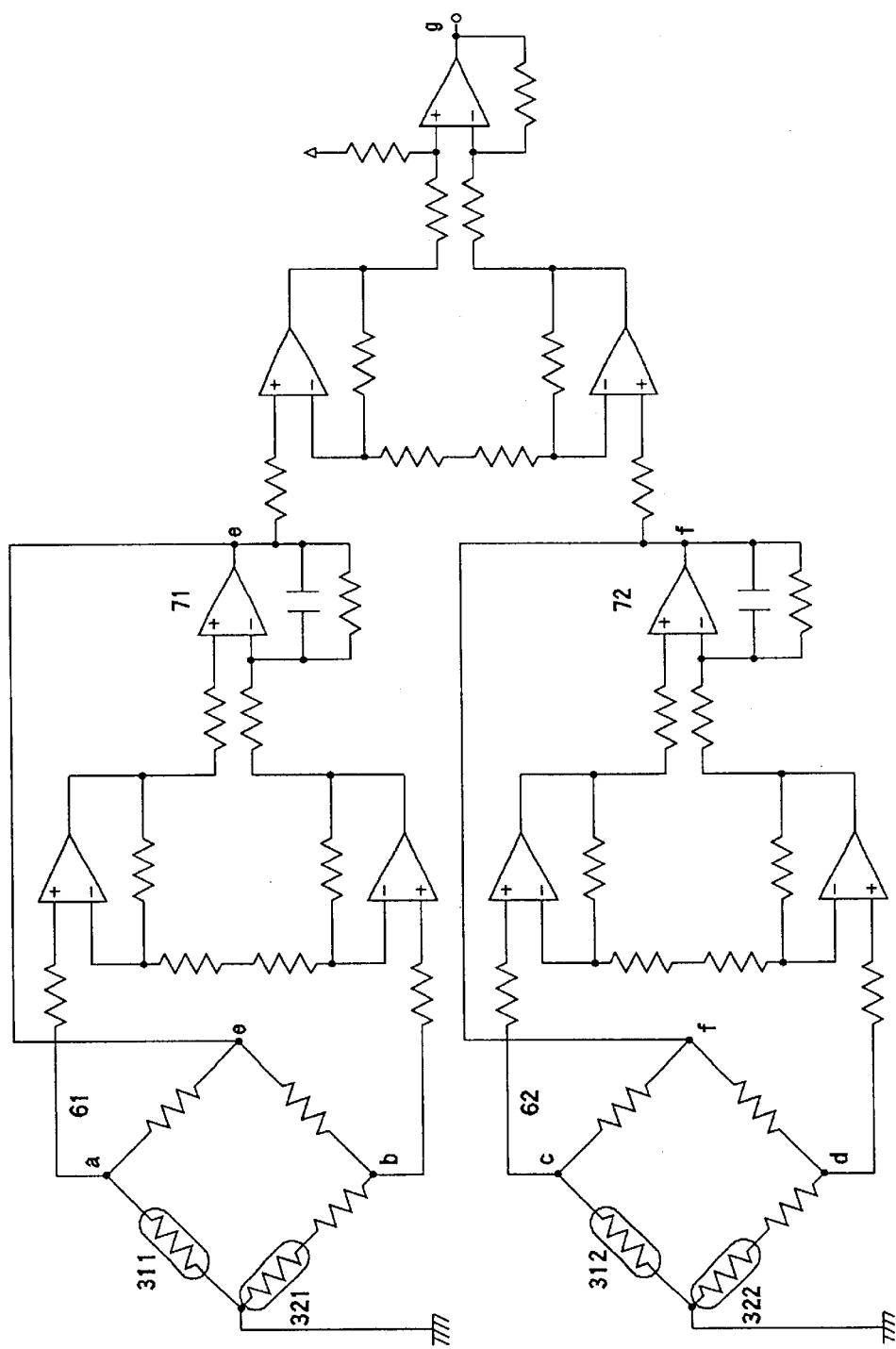
FIG. 3 is a diagram of the circuit of a mass flowmeter.

FIG. 3 shows a circuit of the mass flowmeter including the mass flow sensor of Embodiment 1. The mass flowmeter contains a bridge circuit 61 including the heater 311 and the temperature measurement resistor 321, and a bridge circuit 62 including the heater 312 and the temperature measurement resistor 322. The outputs of the bridge circuits 61 and 62 (a, b, c, and d shown in FIG. 3) are fed to power source circuits 71 and 72, and thus feedback control can be attained. The difference (g shown in FIG. 3) between the outputs of the power source circuits 71 and 72 (e and f shown in FIG. 3) is calculated, and is output as the mass flow of a fluid under measurement.

Figure 4:
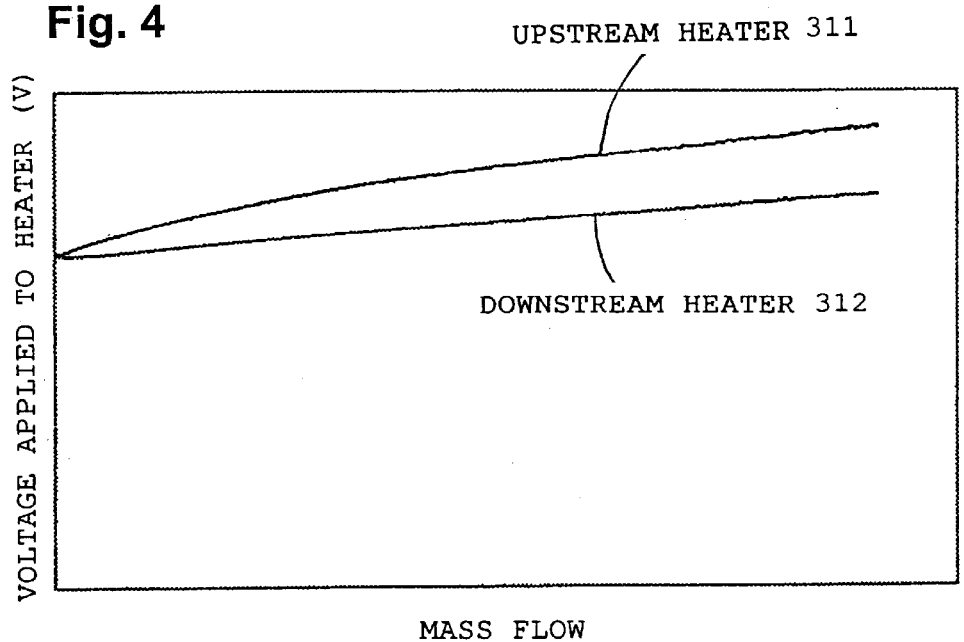
FIG. 4 is a graph showing the relation between voltage applied to the heater and mass flow in the mass flow sensor and the mass flowmeter of Embodiment 1.

This control circuit maintains a constant difference between the temperature of the heater 311 and the temperature of a fluid detected by the temperature measurement resistor 321, and a constant difference between the temperature of the heater 312 and the temperature of the fluid detected by the temperature measurement resistor 322. When a fluid under measurement stands still, the power required for maintaining a constant difference between the temperature of the heater 311 and the temperature of the fluid becomes equal to that required for maintaining a constant difference between the temperature of the heater 312 and the temperature of the fluid. Therefore, as shown in FIG. 4, the voltage applied to the bridge circuit 61 becomes equal to that applied to the bridge circuit 62.

Figure 5:
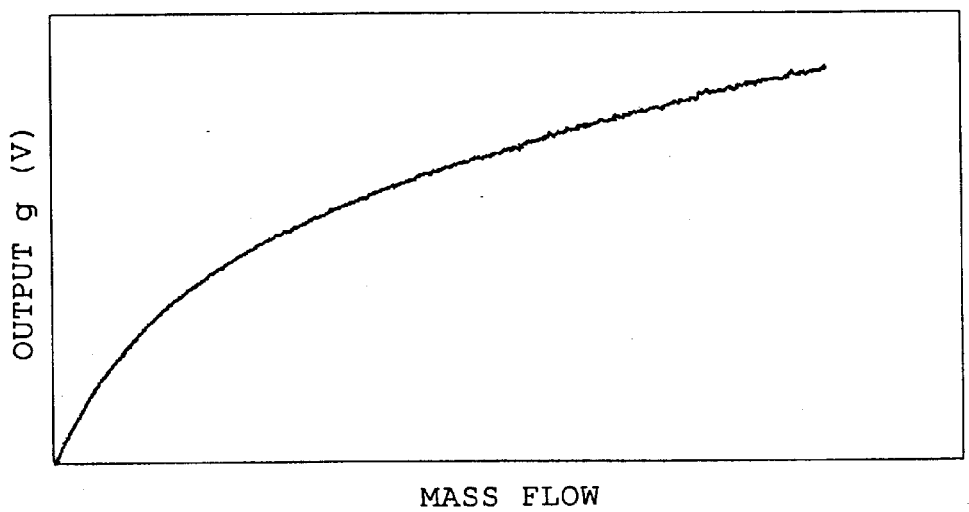
FIG. 5 is a graph showing the relation between mass flow output and mass flow in the mass flow sensor and the mass flow meter of Embodiment 1.

In the case in which a fluid under measurement flows in direction R shown in FIG. 1, when the fluid passes over the upstream heater 311, the fluid is heated by the heater 311. Therefore, the temperature of the fluid as it passes over the heater 312 becomes higher than that of the fluid as it passes over the heater 311. As a result, as shown in FIG. 4, the power required for maintaining a constant difference between the temperature of the heater 311 and the temperature of the fluid becomes higher than that required for maintaining a constant difference between the temperature of the heater 312 and the temperature of the fluid. As shown in FIG. 5, the mass flow of the fluid can be obtained on the basis of the difference (g) between the voltages applied to the bridge circuits 61 and 62.

When a fluid under measurement flows in direction L shown in FIG. 1, the mass flow of the fluid can be obtained in a manner similar to that in the case where the fluid flows in direction R, although the power required for maintaining a constant difference between the temperature of the heater 312 and the temperature of the fluid becomes higher than that required for maintaining a constant difference between the temperature of the heater 311 and the temperature of the fluid, and the voltage applied to the heater 312 becomes higher than the voltage applied to the heater 311.

4. Effects of Mass Flow Sensor and Mass Flowmeter

In the mass flow sensor and the mass flowmeter, the flow rate and flow direction of a fluid can be detected by means of merely the heaters 311 and 312, which are active elements. Therefore, the sensor and the flowmeter exhibits high-speed response with respect to change in the flow rate of the fluid.

Since the heat capacity of a portion surrounding the heaters 311 and 312 is reduced by providing the cavity 5 below the heaters, the response of the heaters 311 and 312 can be enhanced. In addition, accurate detection of the flow rate or mass flow of a fluid is realized within a short period of time even at the time of start-up.

Since the mass flowmeter contains the bridge circuit including the heater 311 and the temperature measurement resistor 321, and the bridge circuit including the heater 312 and the temperature measurement resistor 322, for each heater a constant difference can be maintained between the temperature of the heater and the temperature of a fluid. Therefore, the mass flow of a fluid under measurement can be detected accurately even in the case in which the temperature and flow rate of the fluid change.

Since the heaters 311 and 312 and the temperature measurement resistors 321 and 322 are protected by the protective layer 4, impairment of and damage to the heaters and the resistors, which would otherwise be caused by a fluid or dust in the fluid, can be prevented. Since one end of the heater 311 is connected to one end of the temperature measurement resistor 321 by use of the electrode 332, and one end of the heater 312 is connected to one end of the temperature measurement resistor 322 by use of the electrode 335, the number of lead wires to be connected to the electrodes of the mass flow sensor can be reduced, and the stability of the bridge circuits can be enhanced.

Figure 6:
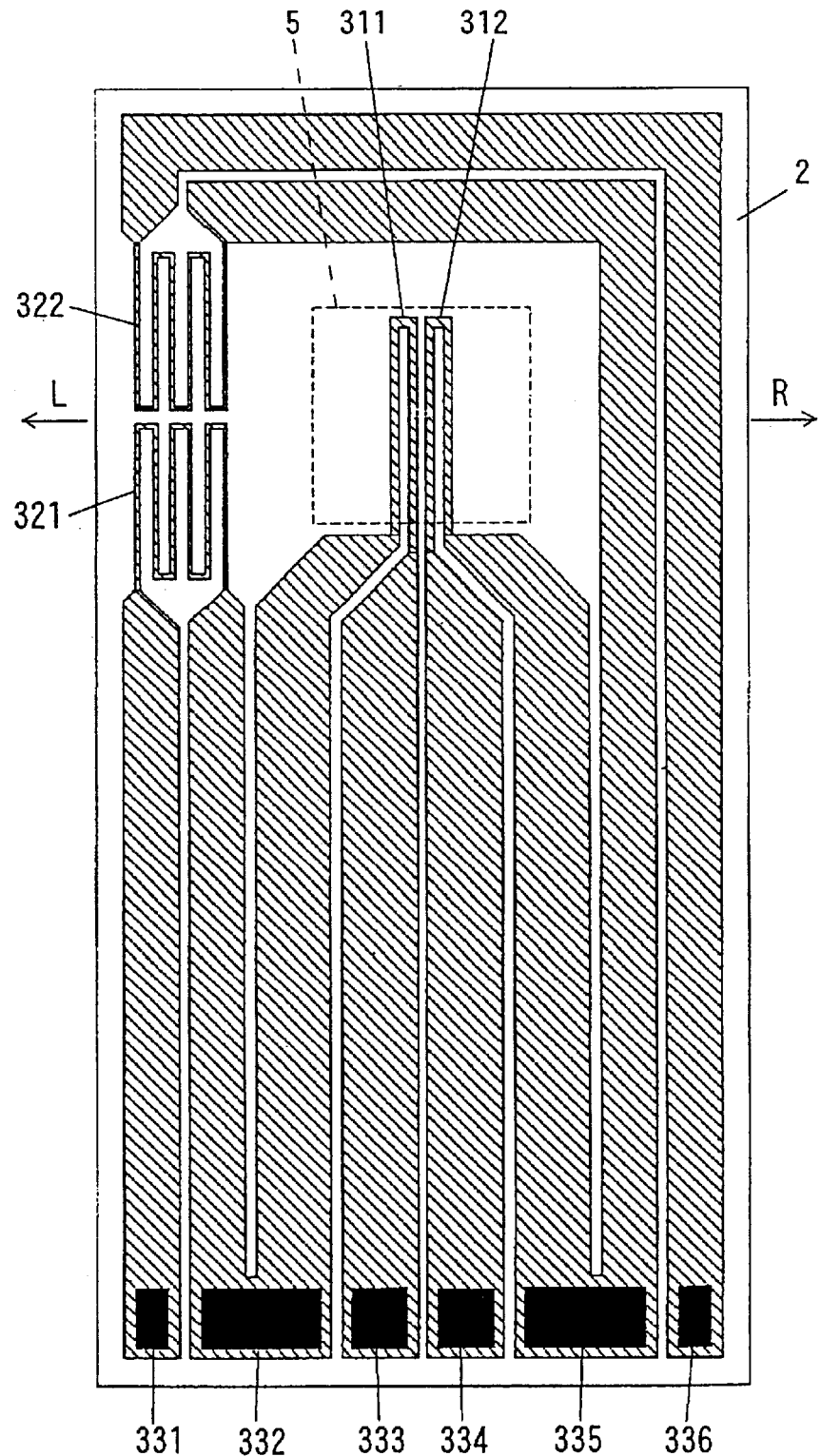
FIG. 6 is a schematic plan view for explaining a mass flow sensor of Embodiment 2.

In the mass flow sensor of Embodiment 2, as shown in FIG. 6, temperature measurement resistors 321 and 322 are provided upstream (or downstream) of heaters 311 and 312 such that the resistors are located symmetrically with respect to a line parallel to the direction of the flow passage of a fluid.

In the mass flow sensor and the mass flowmeter including the sensor, since the temperature measurement resistors 321 and 322 are located at the same position with respect to the direction of the flow passage of a fluid, the temperature of the fluid as detected by the resistor 321 is the same as that of the fluid as detected by the resistor 322. Therefore, for each heater, a constant difference between the temperature of the heater and the temperature of the fluid can be maintained more easily as compared with the case of the mass flow sensor of Embodiment 1.

The mass flow sensor of Embodiment 2 can be produced through a process similar to that for producing the mass flow sensor of Embodiment 1. The mass flowmeter of Embodiment 2 can employ the same circuit as that of the mass flowmeter of Embodiment 1.

Figure 7:
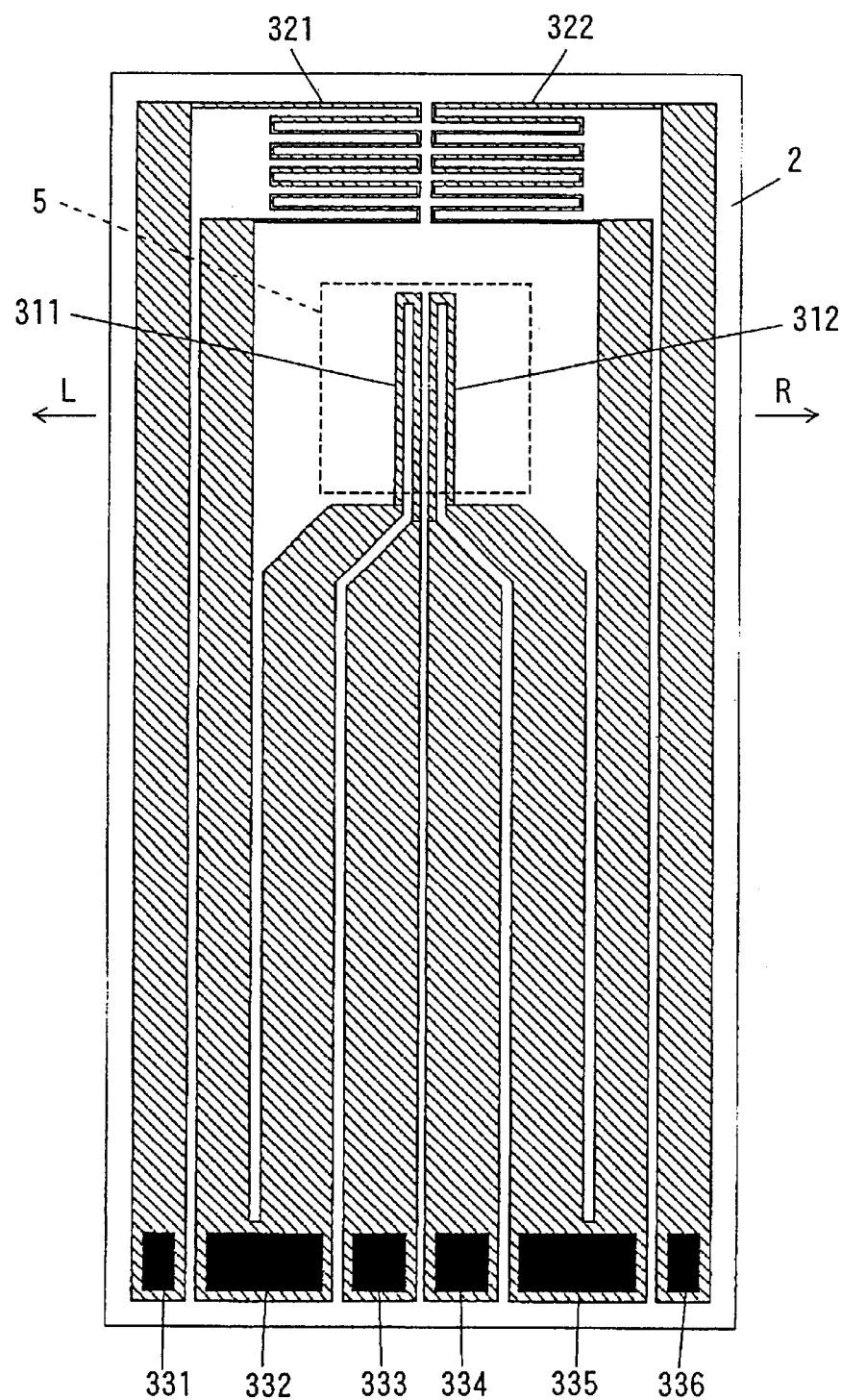
FIG. 7 is a schematic plan view for explaining a mass flow sensor of Embodiment 3.

In the mass flow sensor of Embodiment 3, as shown in FIG. 7, temperature measurement resistors 321 and 322 are provided along a line different from a line passing through heaters 311 and 312, these lines being parallel to the direction of the flow passage a fluid. The temperature measurement resistors 321 and 322 are located to be adjacent to each other such that the resistors 321 and 322 assume the same position as that of the heaters 311 and 312 with respect to the direction of the flow passage of the fluid.

In the mass flow sensor and the mass flowmeter including the sensor, since the temperature measurement resistors 321 and 322 are located at substantially the same position with respect to the direction of the flow passage of a fluid, the temperature of the fluid detected by the resistor 321 is the same as that of the fluid detected by the resistor 322. In addition, the resistors are not easily affected by heating of the heaters 311 and 312, regardless of the direction of the flow passage of the fluid. Therefore, for each heater, a constant difference between the temperature of the heater and the temperature of the fluid can be maintained more easily as compared with the case of the mass flow sensor of Embodiment 1 or 2.

The mass flow sensor of Embodiment 3 can be produced through a process similar to that for producing the aforementioned mass flow sensor. The mass flowmeter of Embodiment 3 can employ the same circuit as that of the aforementioned mass flowmeter.

Figure 8:
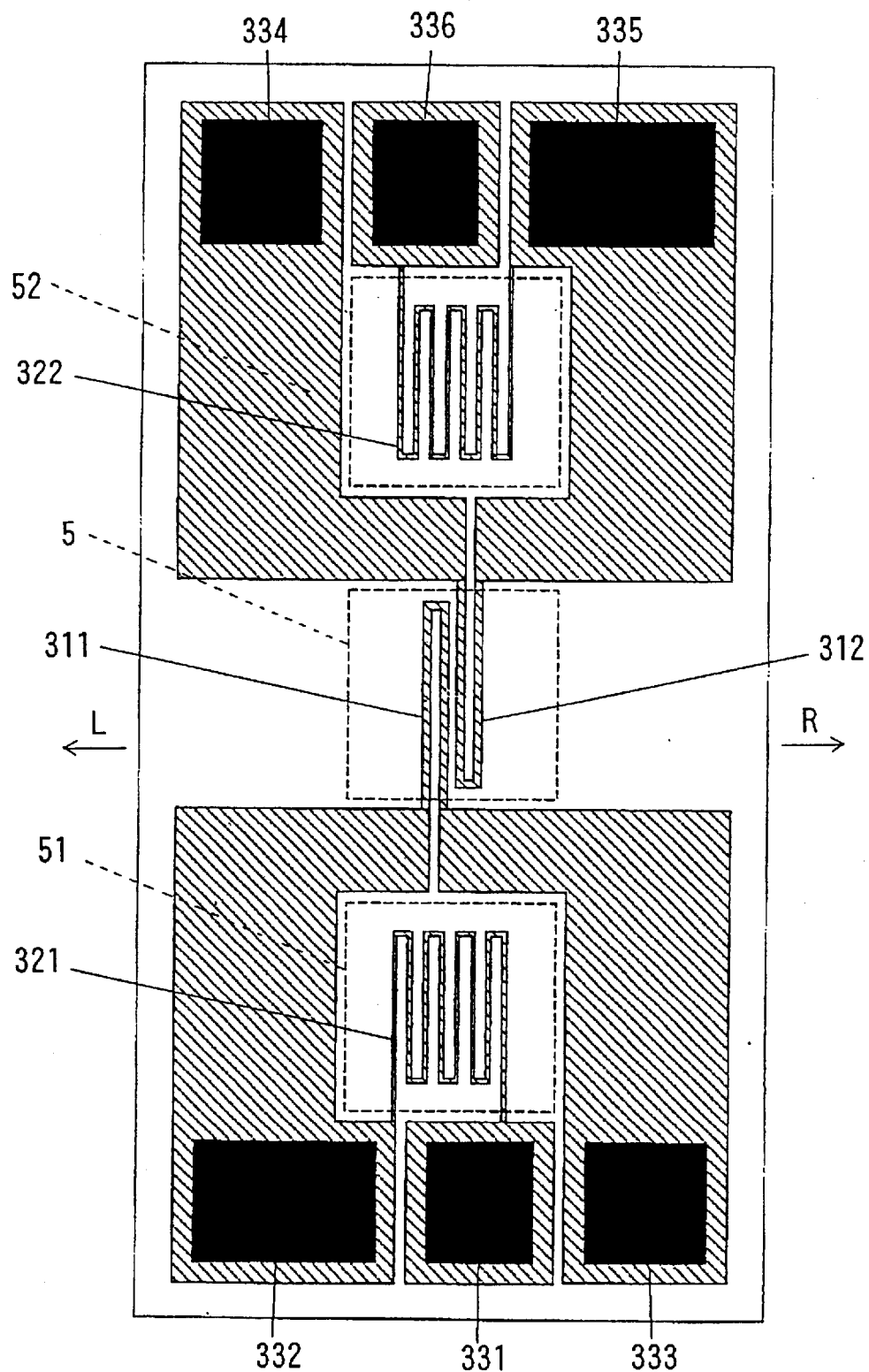
FIG. 8 is a schematic plan view for explaining a mass flow sensor of Embodiment 4.

In the mass flow sensor of Embodiment 4, as shown in FIG. 8, temperature measurement resistors 321 and 322 are provided on lines different from a line passing through heaters 311 and 312, these lines being parallel to the direction of the flow passage a fluid. The temperature measurement resistors 321 and 322 are located at positions corresponding to those of the heaters with respect to the direction of the flow passage of the fluid, such that the resistors sandwich the heaters 311 and 312. Cavities 51 and 52 are provided below the temperature measurement resistors 321 and 322, respectively, the cavities being formed by partially removing the semiconductor substrate.

In the mass flow sensor and the mass flowmeter including the sensor, since the temperature measurement resistors 321 and 322 are located at the same position with respect to the direction of the flow passage of a fluid, the temperature of the fluid detected by the resistor 321 is the same as that of the fluid detected by the resistor 322. In addition, the resistors are not easily affected by heating of the heaters 311 and 312, regardless of the direction of the flow passage of the fluid. Therefore, for each heater, a constant difference between the temperature of the heater and the temperature of the fluid can be maintained more easily as compared with the case of the mass flow sensor of Embodiment 1 or 2. Furthermore, since the heat capacity of portions in the vicinity of the temperature measurement resistors 321 and 322 can be reduced, response of the resistors 321 and 322 with respect to change in the temperature of the fluid can be enhanced.

The mass flow sensor of Embodiment 4 can be produced through a process similar to that for producing the aforementioned mass flow sensor. The mass flowmeter of Embodiment 4 can employ the same circuit as that of the aforementioned mass flowmeter.

Figure 9:
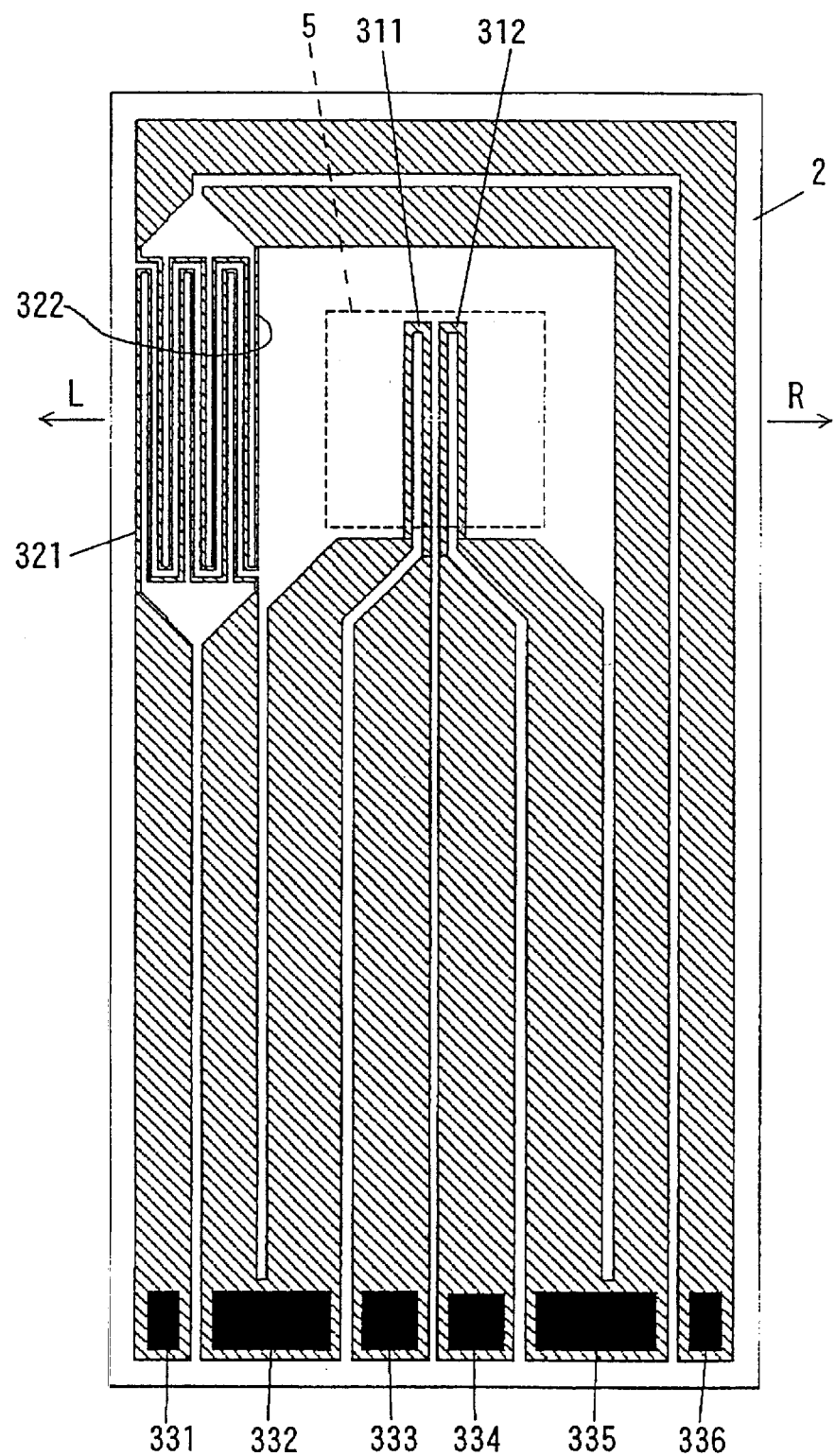
FIG. 9 is a schematic plan view for explaining a mass flow sensor of Embodiment 5.

In the mass flow sensor of Embodiment 5, as shown in FIG. 9, temperature measurement resistors 321 and 322 are provided upstream (or downstream) of heaters 311 and 312, such that projecting portions of one of the resistors 321 and 322 are received by retreated portions of the other so as to form an interlocked configuration.

In the mass flow sensor and the mass flowmeter including the sensor, since the temperature measurement resistors 321 and 322 are located at substantially the same position with respect to the direction of the flow passage of a fluid while forming an interlocked configuration, the temperature of the fluid can be detected more accurately as compared with the case of the mass flow sensor of Embodiment 2. Therefore, for each heater, a constant difference between the temperature of the heater and the temperature of the fluid can be maintained more easily as compared with the case of the mass flow sensor of Embodiment 2.

The mass flow sensor of Embodiment 5 can be produced through a process similar to that for producing the aforementioned mass flow sensor. The mass flowmeter of Embodiment 5 can employ the same circuit as that of the aforementioned mass flowmeter.

Figure 10:
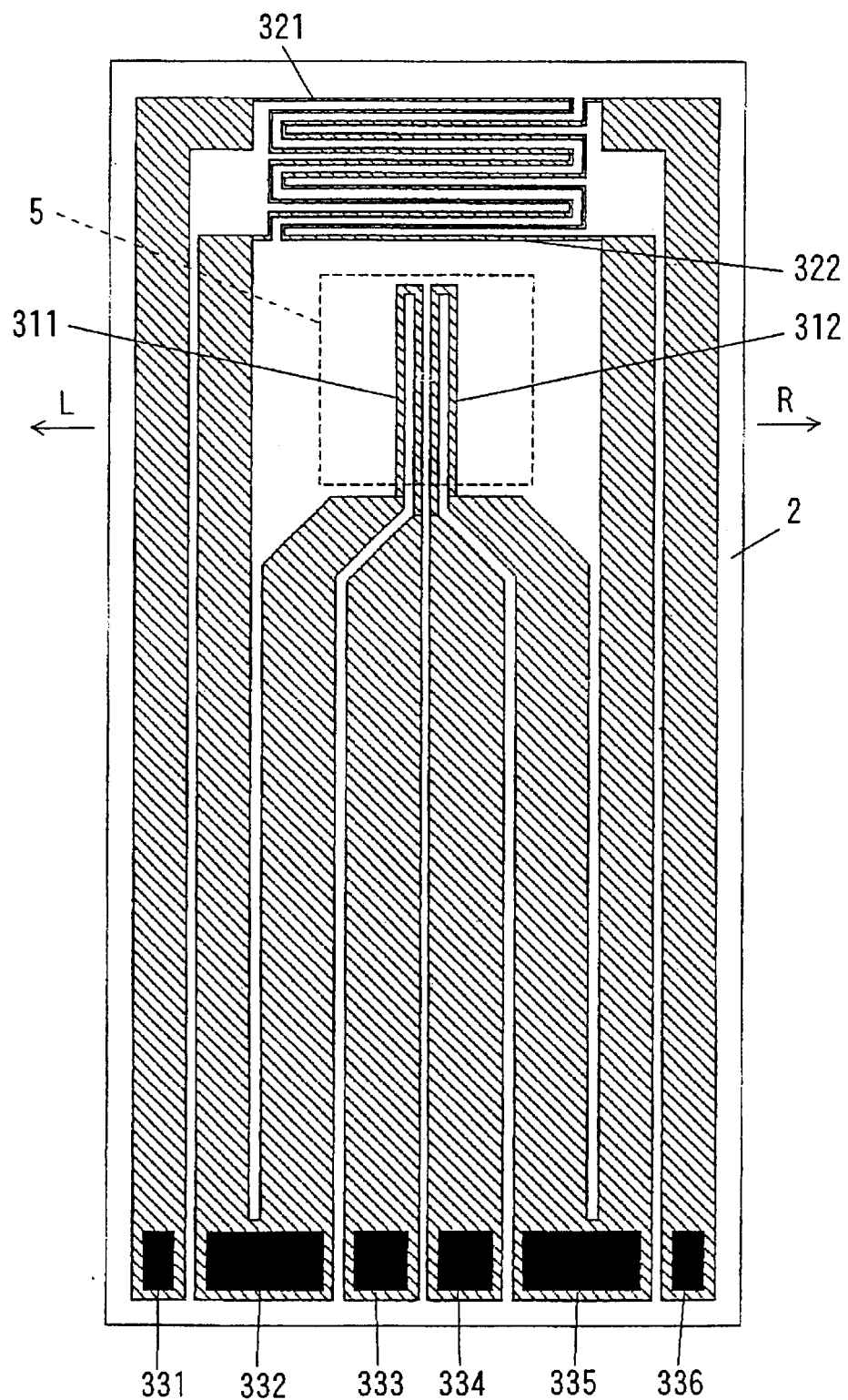
FIG. 10 is a schematic plan view for explaining a mass flow sensor of Embodiment 6.

In the mass flow sensor of Embodiment 6, as shown in FIG. 10, temperature measurement resistors 321 and 322 are provided along a line different from a line passing through heaters 311 and 312, these lines being parallel to the direction of the flow passage a fluid. The temperature measurement resistors 321 and 322 assume the same position as that of the heaters 311 and 312 with respect to the direction of flow passage of the fluid. In a manner similar to that of Embodiment 5, the resistors 321 and 322 are disposed so as to form an interlocked configuration.

In the mass flow sensor and the mass flowmeter including the sensor, since the temperature measurement resistors 321 and 322 are located at substantially the same position with respect to the direction of the flow passage of a fluid while forming an interlocked configuration, the temperature of the fluid can be detected more accurately as compared with the case of the mass flow sensor of Embodiment 3. Therefore, for each heater, a constant difference between the temperature of the heater and the temperature of the fluid can be maintained more easily as compared with the case of the mass flow sensor of Embodiment 3.

The mass flow sensor of Embodiment 6 can be produced through a process similar to that for producing the aforementioned mass flow sensor. The mass flowmeter of Embodiment 6 can employ the same circuit as that of the aforementioned mass flowmeter.

Figure 11:
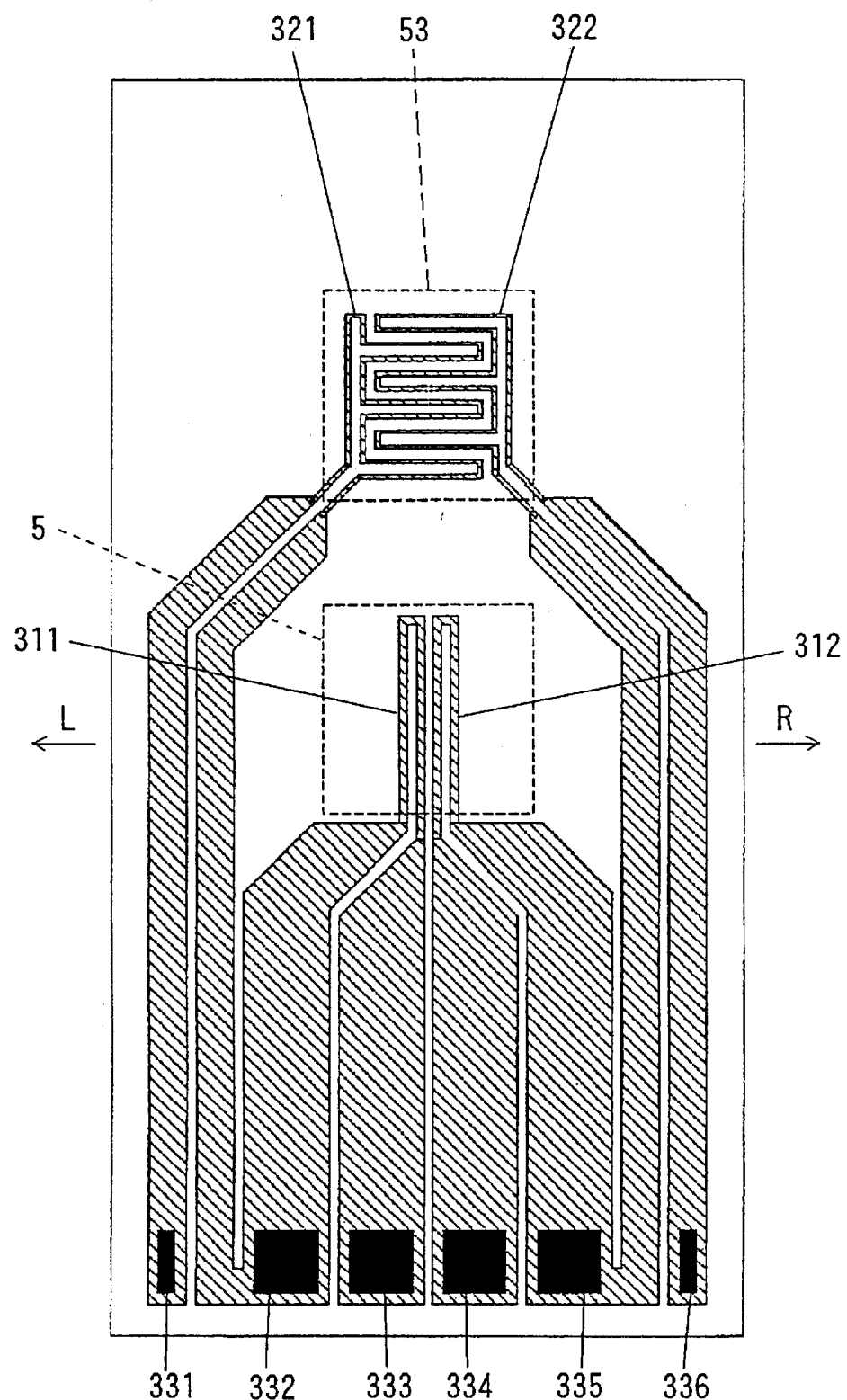
FIG. 11 is a schematic plan view for explaining a mass flow sensor of Embodiment 7.

In the mass flow sensor of Embodiment 7, as shown in FIG. 11, temperature measurement resistors 321 and 322 are provided along a line different from a line passing through heaters 311 and 312, these lines being parallel to the direction of the flow passage of a fluid. The temperature measurement resistors 321 and 322 assume the same position as that of the heaters 311 and 312 with respect to the direction of the flow passage of the fluid. In a manner similar to that of Embodiment 5, the resistors 321 and 322 are disposed so as to form an interlocked configuration. A cavity 53 is provided below the temperature measurement resistors 321 and 322, the cavity being formed by partially removing the semiconductor substrate.

In the mass flow sensor and the mass flowmeter including the sensor, since the temperature measurement resistors 321 and 322 are located at substantially the same position with respect to the direction of the flow passage of a fluid while forming an interlocked configuration, the temperature of the fluid can be detected more accurately as compared with the case of the mass flow sensor of Embodiment 3. Therefore, a constant difference between the temperature of each heater and the temperature of the fluid can be maintained more easily as compared with the case of the mass flow sensor of Embodiment 3. Furthermore, since the heat capacity of a portion in the vicinity of the temperature measurement resistors 321 and 322 can be reduced by means of the cavity 53, response of the resistors 321 and 322 with respect to change in the temperature of the fluid can be enhanced.

The mass flow sensor of Embodiment 7 can be produced through a process similar to that for producing the aforementioned mass flow sensor. The mass flowmeter of Embodiment 7 can employ the same circuit as that of the aforementioned mass flowmeter.

The present invention is not limited to the above-described embodiments. In accordance with purposes and uses, various variations of the present invention may be made without departing from the scope of the present invention.

For example, arrangement of the heaters 311 and 312 of the mass flow sensor of the present invention is not limited to the aforementioned embodiments, and may be determined arbitrarily. The cavity 5 may be provided below each of the heaters 311 and 312. In addition, arrangement of the temperature measurement resistors 321 and 322 of the mass flow sensor of the present invention is not limited to the aforementioned embodiments, and may be determined arbitrarily.

The circuit of the mass flowmeter of the present invention is not limited to the circuit shown in FIG. 3, and may be modified arbitrarily, so long as the modified circuit can maintain a constant difference between the temperature the heater 311 or 312 and the temperature of a fluid detected by the temperature measurement resistor 321 or 322.

For example, the mass flow of a fluid may be obtained not on the basis of the difference (corresponding to the value at point g in FIG. 3) between the voltages applied to the bridge circuits of each Embodiment, but on the basis of the larger of the voltages (e and f shown in FIG. 3) applied to the bridge circuits. Alternatively, the mass flow of the fluid may be obtained on the basis of the difference between the voltages (a and c shown in FIG. 3) applied to the heaters 311 and 312, or on the basis of the larger of the voltages (a and c shown in FIG. 3) applied to the heaters 311 and 312.

In the mass flowmeter of the present invention, the larger of the outputs of the two bridge circuits 61 and 62 can be output as the mass flow of a fluid. For example, the mass flowmeter can employ the circuit shown in FIG. 12. The circuit includes a bridge circuit 61 for maintaining a constant difference between the temperature of a heater 311 and the temperature of a fluid; a bridge circuit 62 for maintaining a constant difference between the temperature of a heater 312 and the temperature of the fluid; a comparator circuit 81 for outputting a signal Vc which has the same polarity as that of the subtraction value obtained by subtracting voltage Vb from voltage Va, the voltages being applied to the bridge circuits; and a switching circuit 82 for outputting either Va or Vb on the basis of the polarity of Vc.

In this circuit, when Va is larger than Vb (i.e., Vc is positive), Va is determined as a mass flow output Vo, whereas when Va is smaller than Vb (i.e., Vc is negative), Vb is determined as the mass flow output Vo. The direction of the flow passage of the fluid can be determined on the basis of the polarity of Vc.

Figure 13:
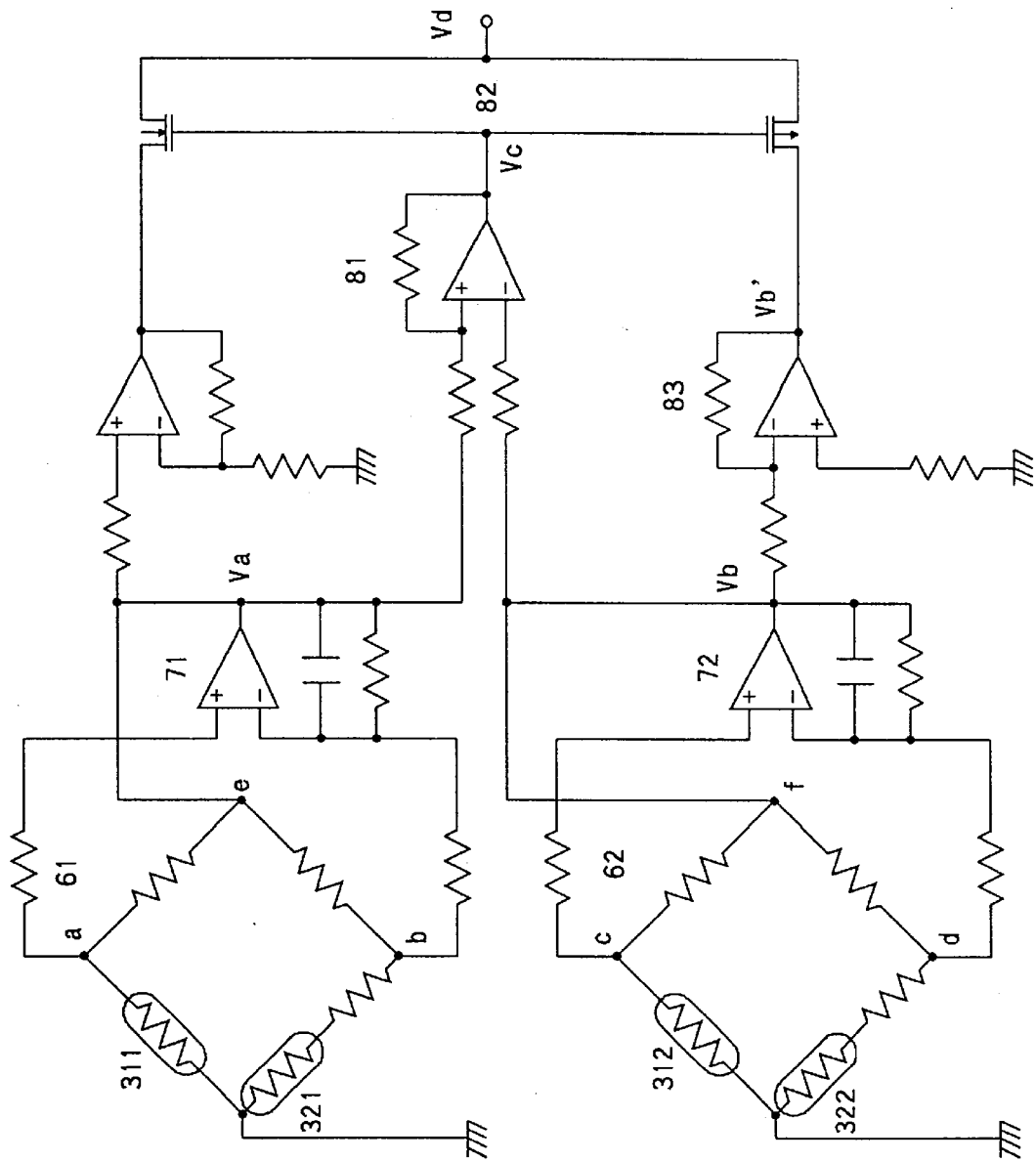
FIG. 13 is a diagram of the circuit of a mass flowmeter designed to output the larger of voltages applied to bridge circuits as the mass flow of a fluid.

The outputs Vc and Vo may be combined into a single output. For example, as shown in FIG. 13, since the polarity of one of the outputs (Va and Vb) fed to a switching circuit 82 is inverted by means of a inversion circuit 83 to obtain output Vb', the mass flow of a fluid can be obtain on the basis of the absolute value of the output Vd of the switching circuit 82. The direction of the flow passage of the fluid can be determined on the basis of the polarity of the output Vd.

Figure 12:
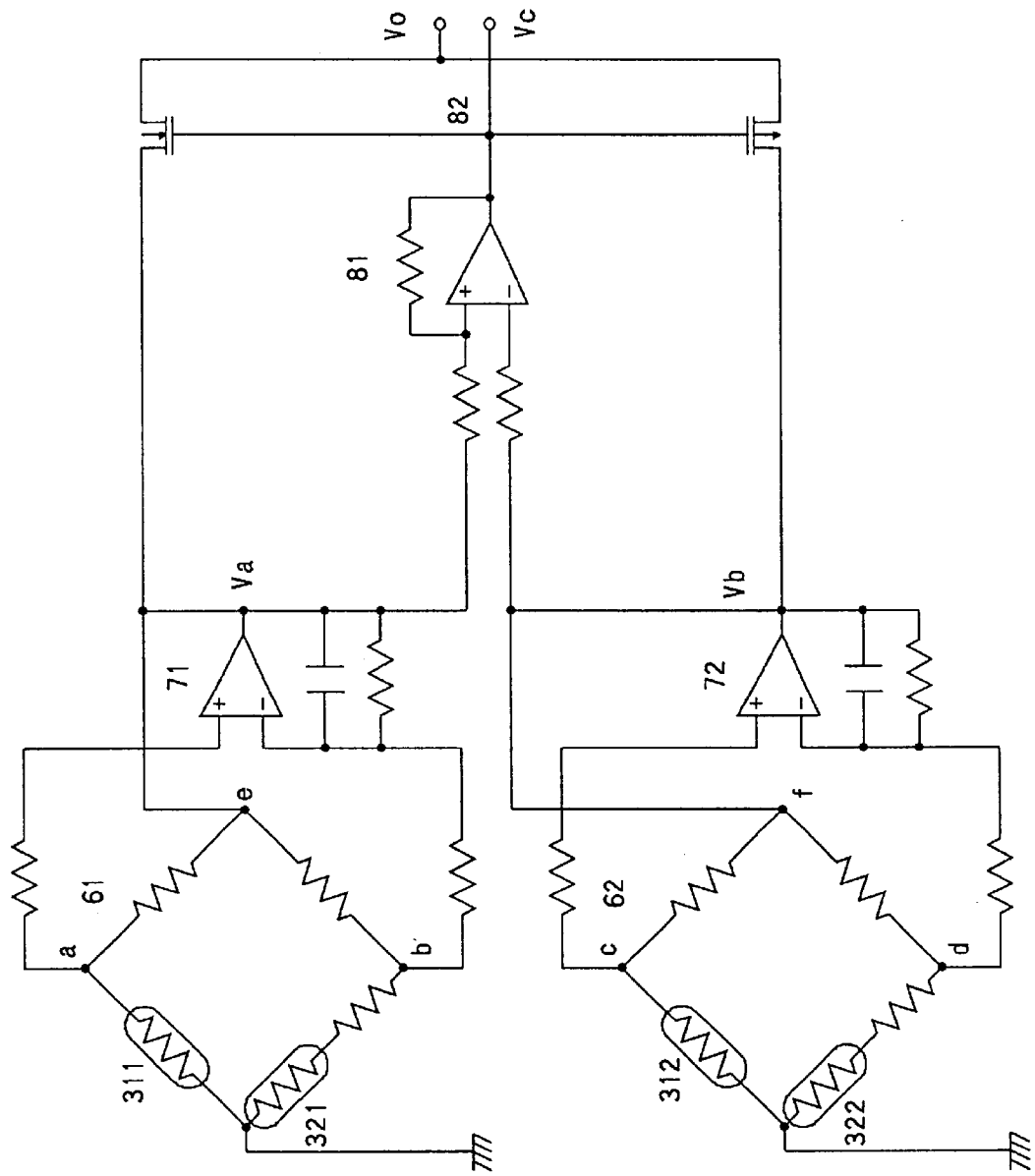
FIG. 12 is a diagram of the circuit of a mass flowmeter designed to output the larger of voltages applied to bridge circuits as the mass flow of a fluid.
Figure 14:
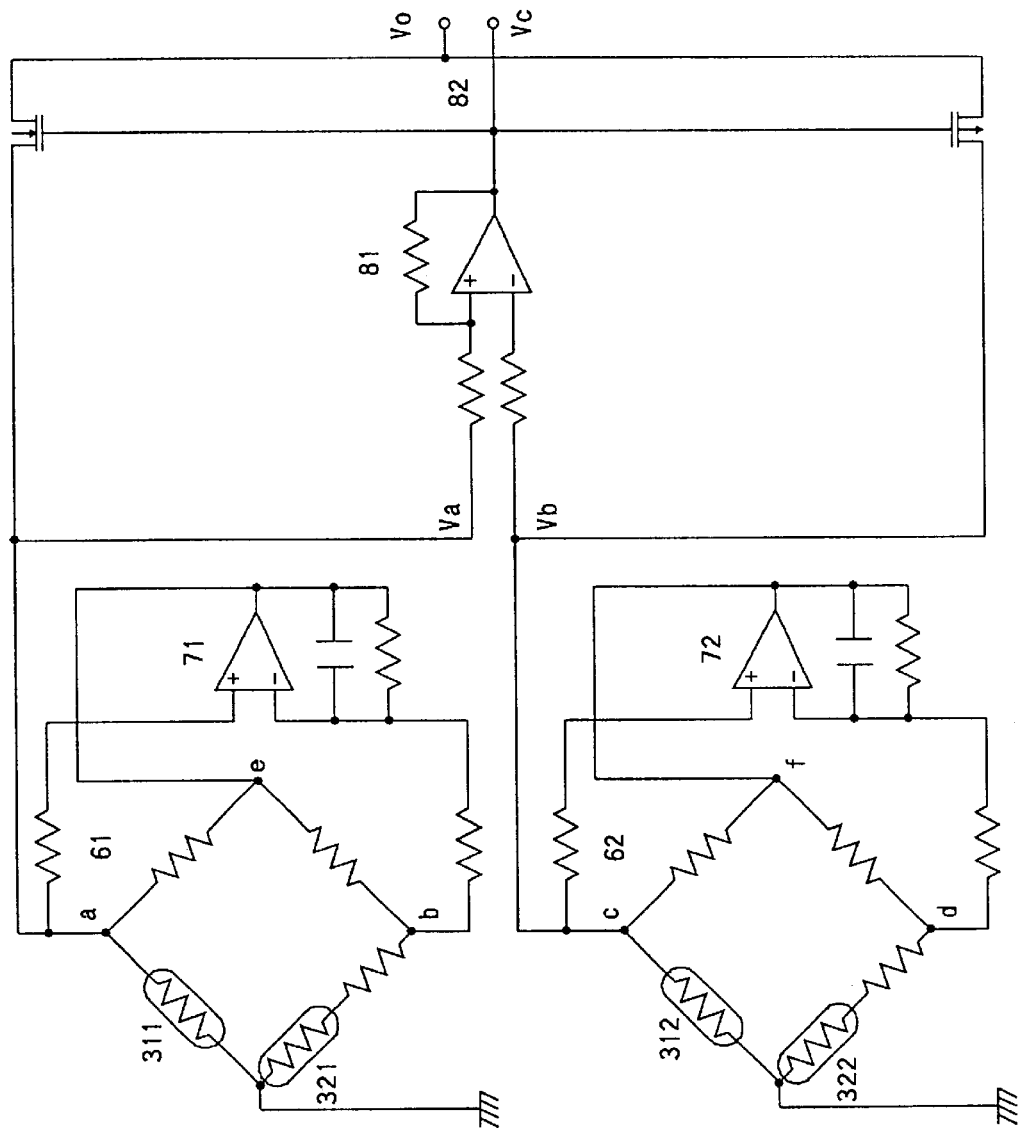
FIG. 14 is a diagram of the circuit of a mass flowmeter designed to output the larger of voltages applied to heaters as the mass flow of a fluid.
Figure 15:
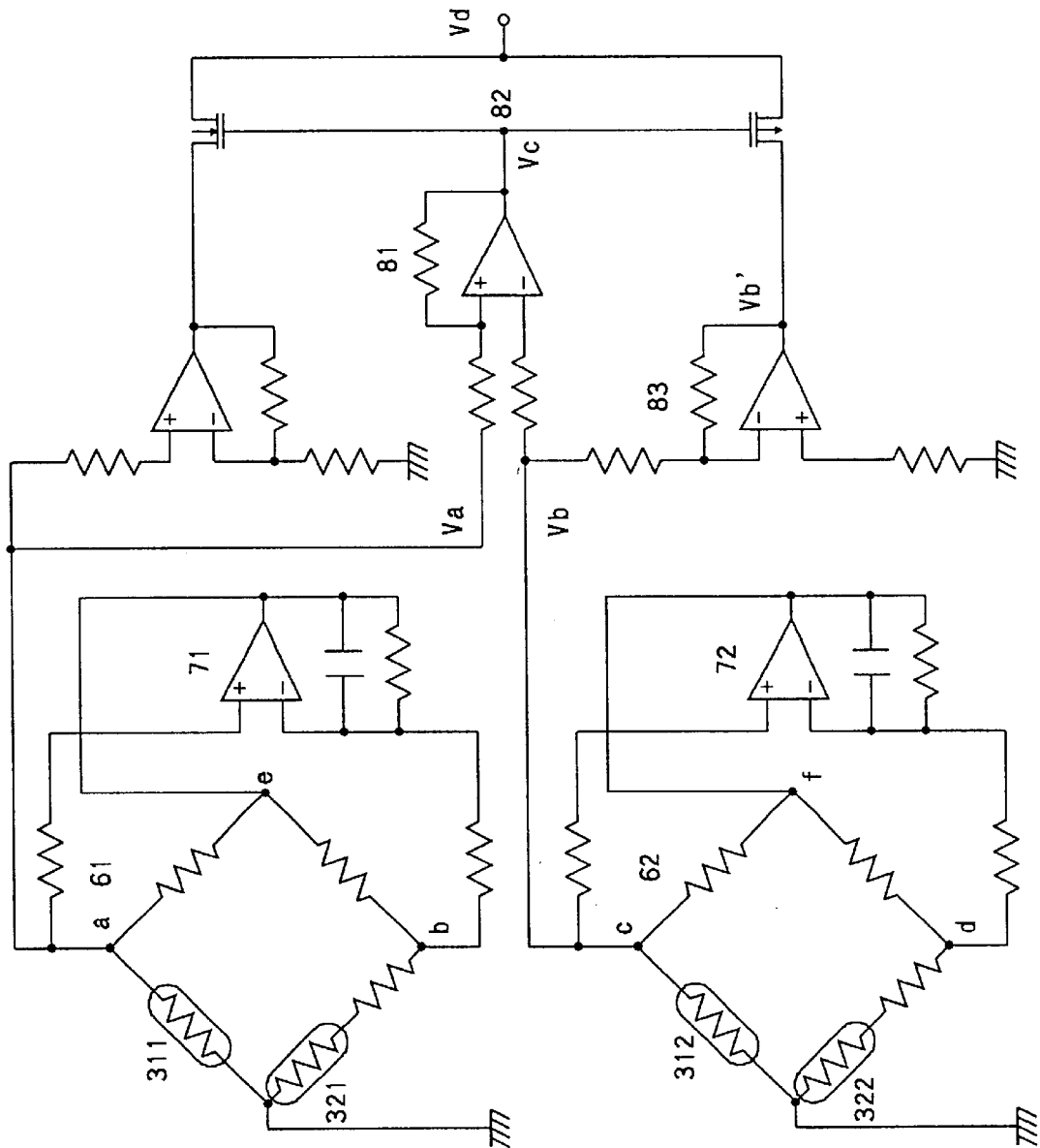
FIG. 15 is a diagram of the circuit of a mass flowmeter designed to output the larger of voltages applied to heaters as the mass flow of a fluid.

The voltages applied to the heaters 311 and 312 (a and c shown in FIGS. 14 and 15) may be input to the comparator circuit 81 and the switching circuit 82, instead of the voltages applied to the bridge circuits 61 and 62 (e and f shown in FIGS. 12 and 13).

The mass flow sensor of the first embodiment provides means for maintaining, for each heater, a constant difference between the temperature of the heater and the temperature of a fluid. Therefore, the mass flow and flow direction of a fluid can be detected accurately without being affected by change in the temperature of the fluid. In addition, impairment of and damage to the heater can be prevented.

The configuration of the mass flow sensor of the second embodiment enhances response with respect to change in the temperature of a fluid. The configuration of the mass flow sensor of the third embodiment reduces the number of lead wires connected to the sensor. In the mass flow sensor of the fourth embodiment, the temperature of a fluid detected by one of the temperature measurement resistors becomes the same as that of the fluid detected by the other resistor.

The configuration of the mass flow sensor of the fifth embodiment eliminates errors in the temperature of a fluid detected by the temperature measurement resistor, the errors being attributed to heating of the heaters. In the mass flow sensor of the sixth embodiment, the temperature of a fluid detected by one of the temperature measurement resistors becomes the same as that of the fluid detected by the other resistor.

In the mass flowmeter of the seventh embodiment, the mass flow and flow direction of a fluid can be detected accurately without being affected by change in the temperature of the fluid.

This application is based on Japanese Patent Application No. 2000-87286 filed Mar. 27, 2000, the disclosure of which is incorporated herein by reference in its entirety.

What is claimed is:

1. A mass flow sensor comprising:
   a semiconductor substrate including a space section formed of a cavity;
   an insulating thin film supported by the semiconductor substrate and adapted to provide thermal and electrical insulation;
   two heaters formed on a portion of the insulation thin film below which the space section is provided;
   two temperature measurement resistors formed on a portion of the insulating thin film which is thermally insulated from the heaters; and
   a protective layer formed on the insulating thin film, the heaters, and the temperature measurement resistors,
   wherein the temperature measurement resistors are formed outside a portion of the insulating thin film below which a space section is provided, and the temperature measurement resistors are provided substantially symmetrically with respect to the position of the heaters and a line parallel to the direction of the flow passage of a fluid under measurement.

2. The mass flow sensor as claimed in claim 1, wherein, on the insulating thin film, one end terminal of each of the heaters is connected to one end terminal of the corresponding temperature measurement resistor.

3. The mass flow sensor as claimed in claim 1, wherein the temperature measurement resistors are provided along a line different from a line passing through the heater, these lines being parallel to the direction of the flow passage.

4. A mass flowmeter comprising a mass flow sensor as claimed in claim 1, further comprising a circuit for maintaining, for each heater, a constant difference between the temperature of the heater and the temperature of a fluid under measurement which is detected by the temperature measurement resistor corresponding to the heater.

5. The mass flowmeter as claimed in claim 4, which comprises two bridge circuits, each bridge circuit including one of the heaters and the temperature measurement resistor corresponding to the heater; and two heater power source circuits for maintaining, for each heater, a constant difference between the temperature of the heater and the temperature of the fluid, on the basis of outputs of the bridge circuits, the outputs being voltages applied to the bridge circuits or currents flowing through the bridge circuits.

6. The mass flowmeter as claimed in claim 5, which comprises a circuit for calculating the mass flow of the fluid on the basis of a subtraction value obtained by subtracting one of the outputs from the other, and for determining the flow direction of the fluid on the basis of whether the subtraction value is positive or negative.

7. The mass flowmeter as claimed in claim 5, which comprises a circuit for calculating the mass flow of the fluid on the basis of the larger of the outputs, and for determining the flow direction of the fluid on the basis of whether a subtraction value obtained by subtracting one of the outputs from the other is positive or negative.

8. The mass flowmeter as claimed in claim 5, which comprises a circuit for calculating the mass flow of the fluid on the basis of a subtraction value obtained by subtracting one of the voltages applied to the heaters from the other or by subtracting one of the currents flowing through the heaters from the other, or on the basis of the larger of the voltages or the currents, and for determining the flow direction of the fluid on the basis of whether the subtraction value is positive or negative.

9. The mass flow sensor as claimed in claim 1, wherein each of the temperature measurement resistors is formed on an opposite side of the space section.

10. A mass flow sensor comprising:
    a semiconductor substrate including a space section formed of a cavity;
    an insulating thin film supported by the semiconductor substrate and adapted to provide thermal and electrical insulation;
    two heaters formed on a portion of the insulation thin film below which the space section is provided;
    two temperature measurement resistors formed on a portion of the insulating thin film which is thermally insulated from the heaters; and
    a protective layer formed on the insulating thin film, the heaters, and the temperature measurement resistors,
    wherein the temperature measurement resistors are provided along a line different from a line passing through the heater, these lines being parallel to the direction of the flow passage.

11. A mass flow sensor comprising:
    a semiconductor substrate including a space section formed of a cavity;
    an insulating thin film supported by the semiconductor substrate and adapted to provide thermal and electrical insulation;
    two heaters formed on a portion of the insulation thin film below which the space section is provided;
    two temperature measurement resistors formed on a portion of the insulating thin film which is thermally insulated from the heaters; and
    a protective layer formed on the insulating thin film, the heaters, and the temperature measurement resistors,
    wherein the temperature measurement resistors are disposed so as to form an interlocked configuration.

* * * * *